(12) United States Patent
Shibata et al.

(10) Patent No.: US 6,976,731 B2
(45) Date of Patent: Dec. 20, 2005

(54) VEHICLE BODY STRUCTURE

(75) Inventors: Keisuke Shibata, Okazaki (JP); Nobuhiro Oikawa, Okazaki (JP); Yoshiyuki Koshita, Anjo (JP); Toshimitsu Yagi, Komaki (JP)

(73) Assignees: Mitsubishi Jidosha Kogyo Kabushiki Kaisha, (JP); Metaltech Ltd., (JP)

( * ) Notice: Subject to any disclaimer, the term of this patent is extended or adjusted under 35 U.S.C. 154(b) by 0 days.

(21) Appl. No.: 10/757,040

(22) Filed: Jan. 14, 2004

(65) Prior Publication Data

US 2004/0201259 A1 Oct. 14, 2004

(30) Foreign Application Priority Data

Jan. 17, 2003 (JP) .............................. 2003-009139

(51) Int. Cl.[7] ............................................. B62D 25/20
(52) U.S. Cl. .................................. 296/204; 296/203.03
(58) Field of Search ............... 296/203.03, FOR 65.09, 296/FOR 37.2, FOR 203.04, FOR 204, 37.16, 296/204

(56) References Cited

U.S. PATENT DOCUMENTS 5,921,618 A * 7/1999 Mori et al. ............ 296/187.12

FOREIGN PATENT DOCUMENTS

DE 4020363 * 1/1992 ................. 296/204
JP 406247211 * 9/1994 ................. 296/37.2

* cited by examiner

*Primary Examiner*—Dennis H. Pedder
(74) *Attorney, Agent, or Firm*—Rossi, Kimms & McDowell, LLP

(57) ABSTRACT

In a vehicle body structure, an accommodation concavity is provided in a floor panel. A pair of side members each having a nearly vertical first side surface portion extend bilaterally of the accommodation concavity. The floor panel is composed of a first floor panel having a first bottom surface portion serving as the bottom surface of the accommodation concavity, and second side surface portions erected in a nearly vertical direction from the first bottom surface portion and placed adjacent to the first side surface portions; and second floor panels each having a second bottom surface portion placed above the side member, and a third side surface portion erected in a nearly vertical direction from the second bottom surface portion and placed adjacent to and outwardly of the first side surface portion in a vehicle width direction. The side member, the first floor panel and the second floor panel are joined together at the first side surface portion, the second side surface portion, and the third side surface portion. Since the width of the junction between the floor panel and the side member is decreased, the width of the accommodation concavity can be increased.

8 Claims, 5 Drawing Sheets

VEHICLE BODY STRUCTURE

The entire disclosure of Japanese Patent Application No. 2003-009139 filed on Jan. 17, 2003, including specification, claims, drawings and summary, is incorporated herein by reference in its entirety.

BACKGROUND OF THE INVENTION

1. Field of the Invention

This invention relates to the vehicle body structure of a vehicle having a rear portion where an accommodation concavity capable of accommodating a folding seat is provided.

2. Description of the Related Art

A vehicle of a wagon type, which has seats in a third row provided behind seats in a second row, has been put to practical use. The seats in the third row are constituted such that the seat back can be tilted toward the seat cushion and superposed thereon, whereafter this superposed combination of the seat back and the seat cushion can be pivoted rearward, turned upside down and accommodated in an accommodation concavity provided in a rear portion of the vehicle body.

FIG. 7 shows a section of an essential part of a rear portion of a vehicle body representing a conventional vehicle body structure. FIG. 8 shows a section representing a junction between a floor pan and a side member.

In a conventional vehicle body structure, as shown in FIG. 7, a floor pan 101 has an accommodation concavity 102, formed in a central portion in a vehicle width direction, for accommodating seats. Each of opposite side portions in the vehicle width direction of the accommodation concavity 102 is erected upward to form a vertical wall portion 103. An upper end portion of the vertical wall portion 103 is bent to form a horizontal portion 104. An end portion of the horizontal portion 104 is joined to a side panel 105. A side member 106 is disposed on each side in the vehicle width direction of the accommodation concavity 102 so as to extend along the longitudinal direction of the vehicle. The side member 106 has an upwardly open U-shaped section, and has right and left flange portions 107 joined to a lower surface of the horizontal portion 104 of the floor pan 101. An acoustic insulator 108 is mounted on the top of the horizontal portion 104, and a carpet 109 is laid on an upper surface of the floor pan 101. The seat is constituted such that a lower portion of a seat back 112 is pivotally attached to a rear portion of a seat cushion 111. The seat is folded, and turned upside down, whereby the seat can be accommodated in the accommodation concavity 102.

As an example of the conventional vehicle body structure having such a folding seat, there is the technique described in a patent document 1 (Japanese Patent Publication Laid-Open No. 2001-063421).

For a vehicle having seats which can be accommodated under the floor of the vehicle, there is a demand that an ample width of the seat be secured for increased marketability, such as a comfortable ride or spaciousness. In the above-described conventional vehicle body structure, however, as shown in FIGS. 7 and 8, the floor pan 101 is composed of the accommodation concavity 102, the vertical wall portions 103, and the horizontal portions 104. The right and left flange portions 107 of the side member 106 are joined to the lower surface of the horizontal portion 104 by spot welding. In the floor pan 101, therefore, a bend 110 (bending radius) is required between the vertical wall portion 103 and the horizontal portion 104, and a joining allowance A for joining of the flange portion 107 of the side member 106 is needed. The width of the accommodation concavity 102 is decreased by a width W which is the sum of the bend 110 and the joining allowance A. The decrease in the width of the accommodation concavity 102 poses the problem that ample width of the seat cannot be secured, and marketability declines.

In the "seat accommodation structure of an automobile" described in the aforementioned patent document 1, as in the case of the above-described conventional vehicle body structure, sides of a dish-shaped member are erected from its bottom to form mounting flange portions. Side frames of a tubular shape in section are joined to lower surfaces of the mounting flange portions. Thus, a bending radius is required for the dish-shaped member. As a result, the width W of the bottom of the dish-shaped member, accordingly, the width of the seat, cannot become ample.

SUMMARY OF THE INVENTION

The present invention has been accomplished as a solution to the above-mentioned problems. It is the object of the invention to provide a vehicle body structure in which the width of an accommodation concavity can be increased by decreasing the width of a junction between a floor panel and a side member.

A vehicle body structure according to the present invention, for attaining the above object, is provided with a pair of side members extending in the longitudinal direction of a vehicle, and a floor panel forming an accommodation concavity disposed between the pair of side members, the side members and the floor panel being joined together at nearly vertical surfaces.

Since the side members and the floor panel are joined together at nearly vertical surfaces, the width of the junction between the side member and the floor panel can be decreased by a relatively simple configuration. Consequently, the width of the accommodation concavity can be increased in the direction of the vehicle width.

In the vehicle body structure, each of the side members may have a nearly vertical first side surface portion; the floor panel may have a first bottom surface portion serving as a bottom surface of the accommodation concavity, and second side surface portions erected in a nearly vertical direction from the first bottom surface portion and placed adjacent to the first side surface portions; and each of the first side surface portions and each of the second side surface portions may be joined together.

In the vehicle body structure, each of the side members may have a nearly vertical first side surface portion; the floor panel may be composed of a first floor panel having a first bottom surface portion serving as a bottom surface of the accommodation concavity, and second side surface portions erected in a nearly vertical direction from the first bottom surface portion and placed adjacent to the first side surface portions, and second floor panels each having a second bottom surface portion placed above the side member, and a third side surface portion erected in a nearly vertical direction from the second bottom surface portion and placed adjacent to and outwardly of the first side surface portion in a vehicle width direction; and the first side surface portion, the second side surface portion, and the third side surface portion may be joined together.

In the vehicle body structure, the first floor panel and the second floor panels may be independent of each other.

In the vehicle body structure, a flange portion extending toward an interior of the vehicle maybe formed at the front end of the third side surface portion, and the front end of the first side surface portion and the front end of the second side surface portion may be disposed below the flange portion.

In the vehicle body structure, a flange portion extending toward an exterior of the vehicle maybe formed at the front end of the second side surface portion, and the front end of the first side surface portion and the front end of the third side surface portion may be disposed below the flange portion.

In the vehicle body structure, a sealing member may be mounted between the flange portion and the front end of the first side surface portion and the front end of the second side surface portion, or between the flange portion and the front end of the first side surface portion and the front end of the third side surface portion.

In the vehicle body structure, a vehicle seat may be accommodated in the accommodation concavity.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The preferred embodiments of the present invention will be described in detail with reference to the accompanying drawings.

Figure 1:
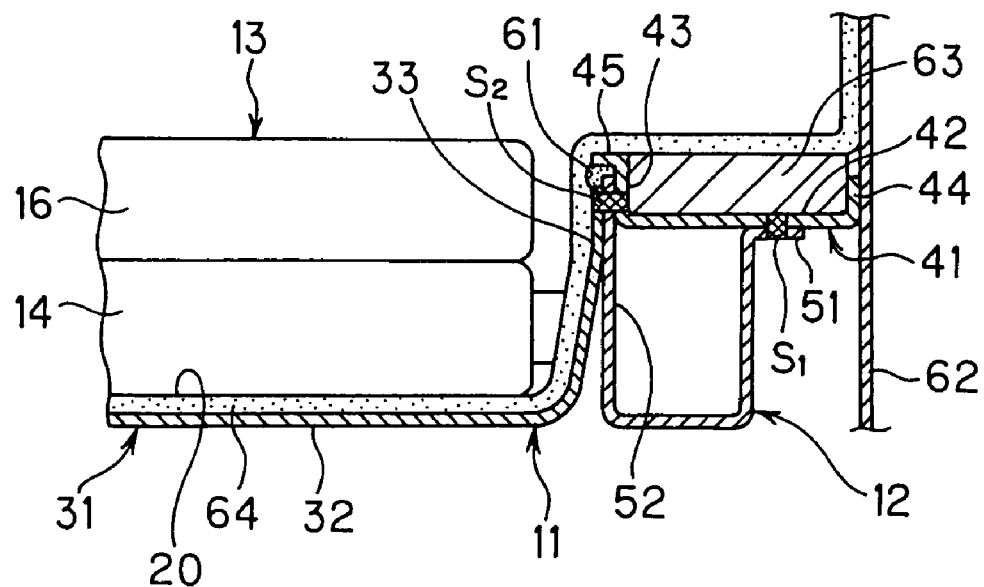
FIG. 1 is a sectional view of an essential part of a vehicle body representing a vehicle body structure according to an embodiment of the present invention.
Figure 2:
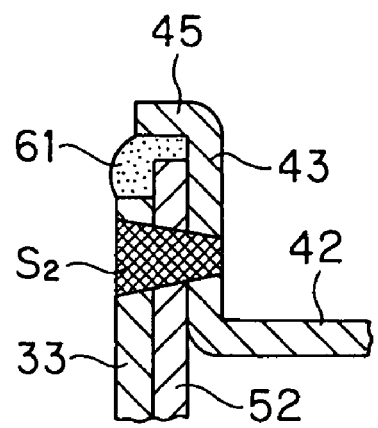
FIG. 2 is a sectional view representing a junction between a rear floor pan and a side member in the vehicle body structure.
Figure 3:
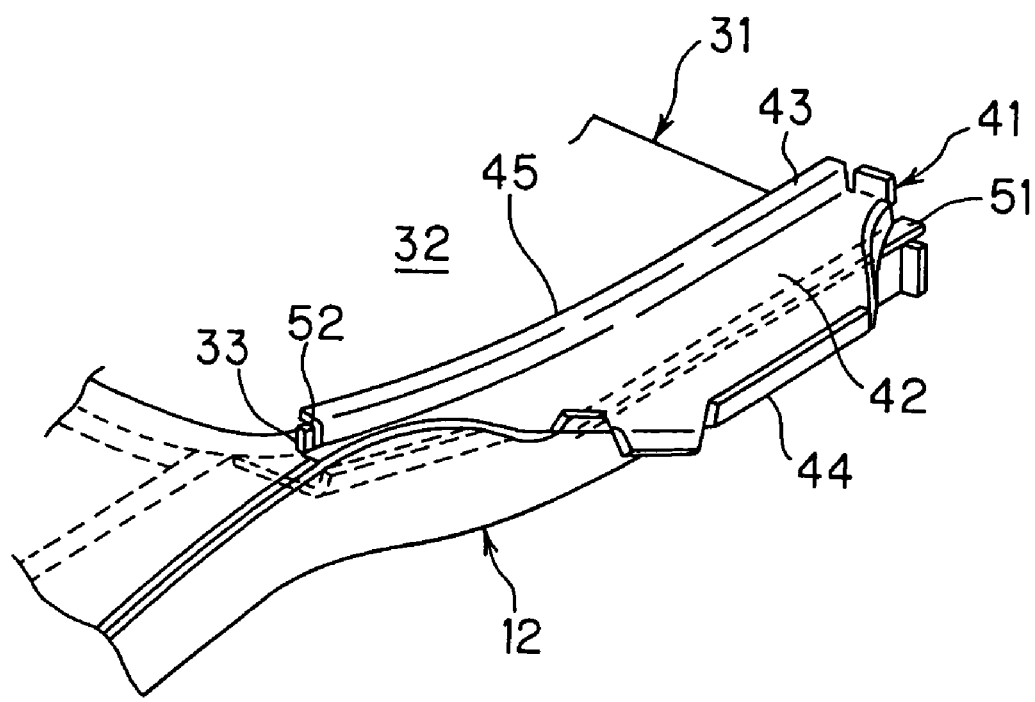
FIG. 3 is a schematic view representing a state of joining between the first and second rear floor pans and the side member.
Figure 4:
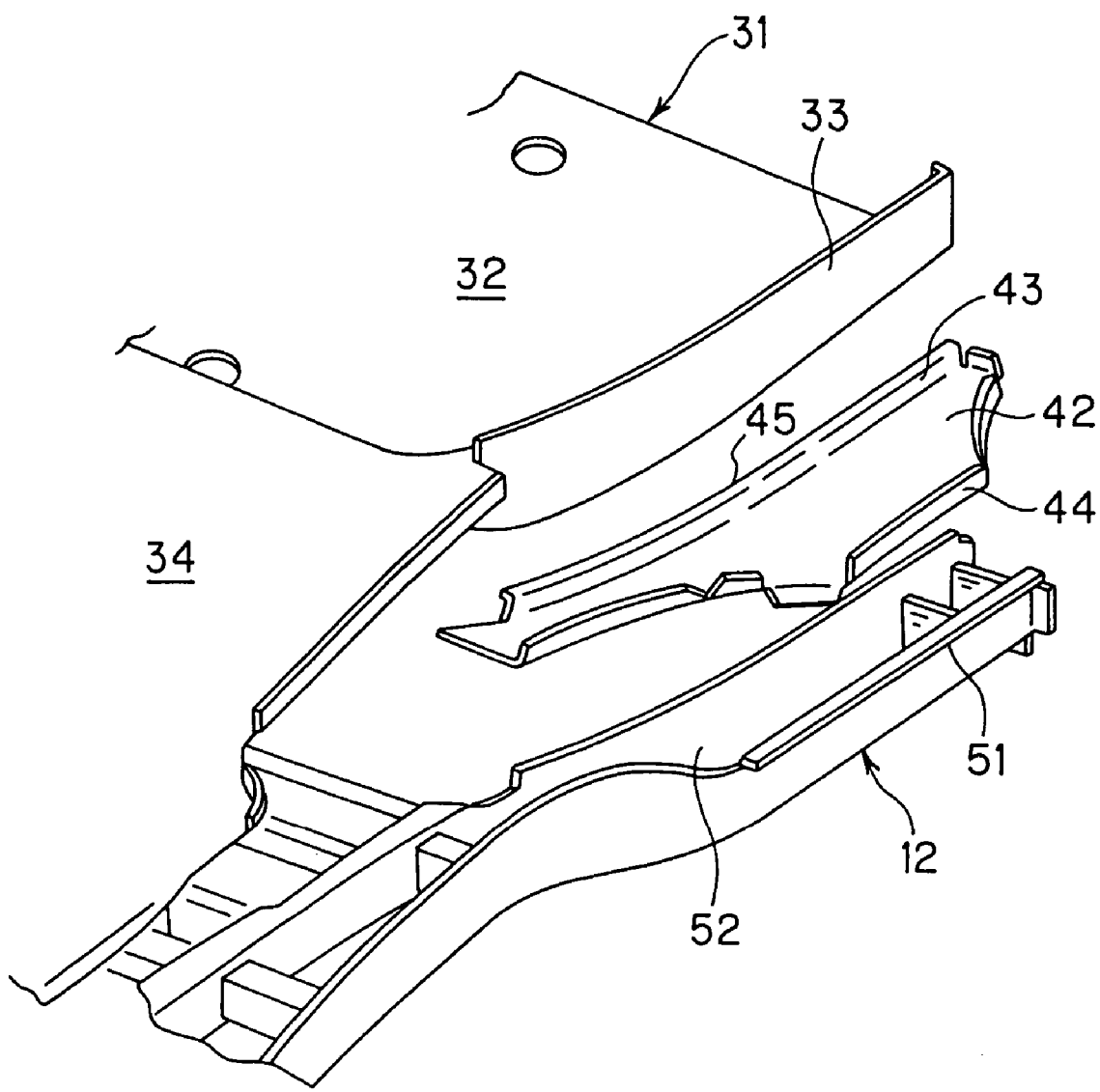
FIG. 4 is an exploded perspective view of the first and second rear floor pans and the side member.
Figure 5:
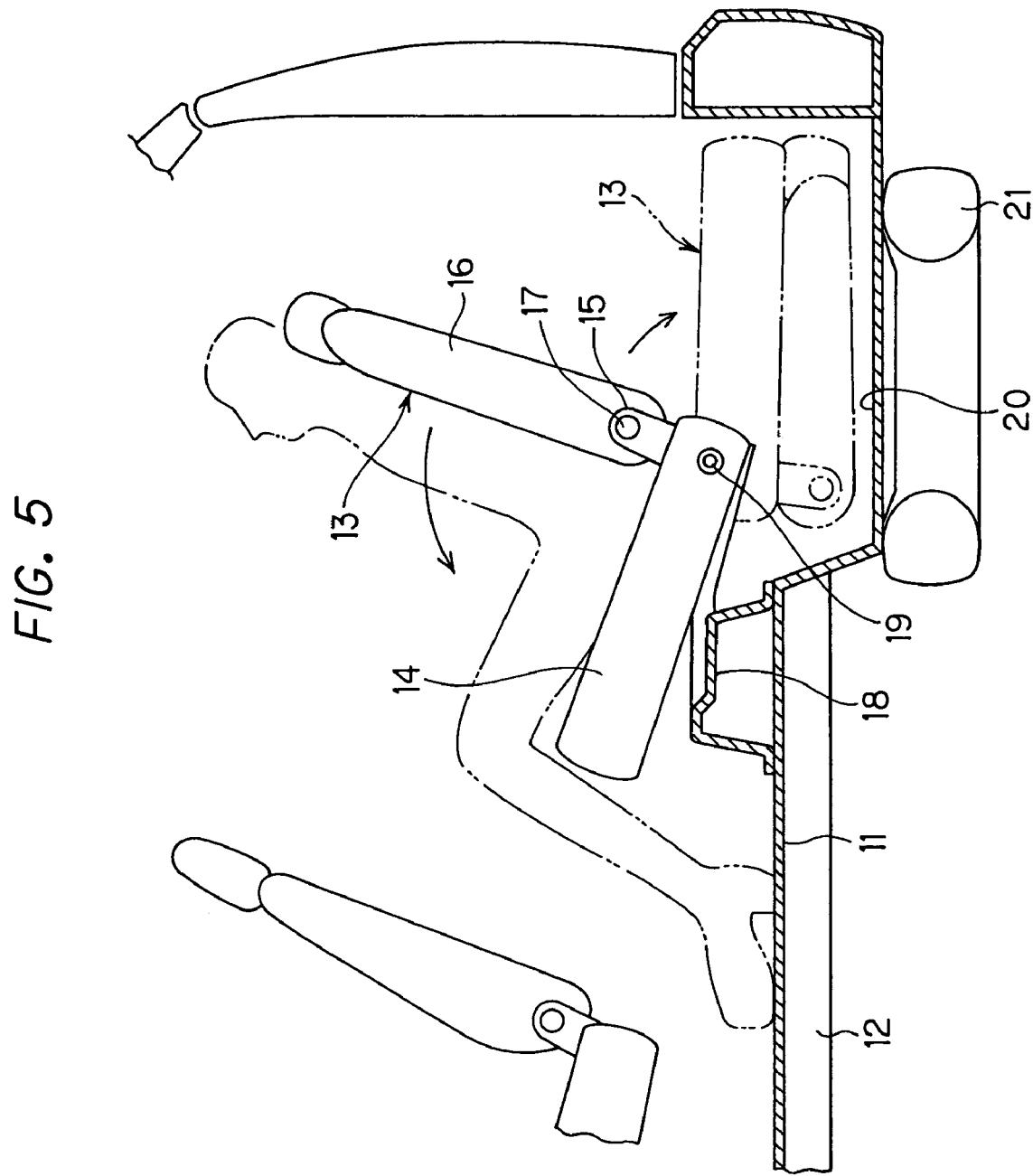
FIG. 5 is a schematic view of a rear portion of a vehicle to which the vehicle body structure of the present embodiment has been applied.
Figure 6:
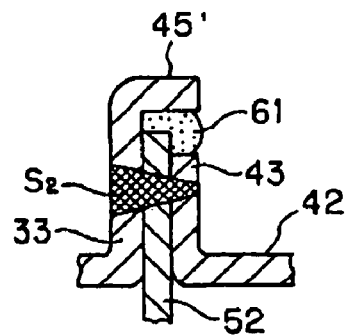
FIG. 6 is a sectional view representing a junction between a rear floor pan and a side member according to another embodiment.
Figure 7:
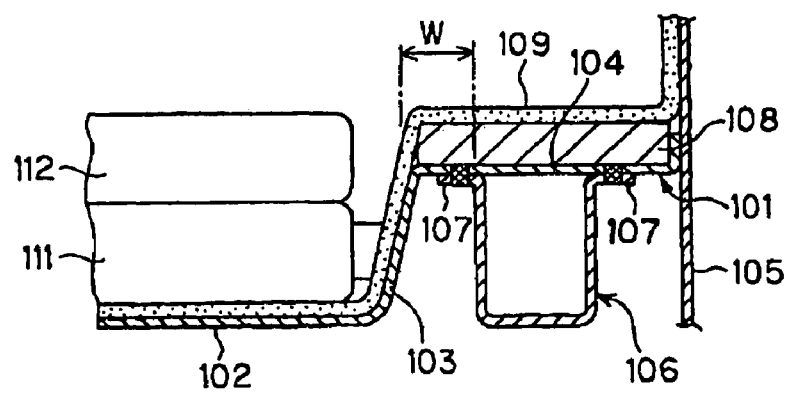
FIG. 7 is a sectional view of an essential part of a rear portion of a vehicle body representing a conventional vehicle body structure.
Figure 8:
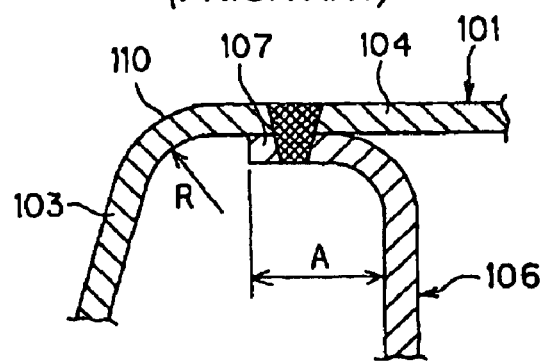
FIG. 8 is a sectional view representing a junction between a floor pan and a side member in the conventional vehicle body structure.

FIG. 1 shows a section of an essential part of a vehicle body representing a vehicle body structure according to an embodiment of the present invention. FIG. 2 shows a section representing a junction between a rear floor pan and a side member. FIG. 3 schematically shows the state of joining between the first and second rear floor pans and the side member. FIG. 4 shows, in an exploded perspective manner, the first and second rear floor pans and the side member. FIG. 5 schematically shows a rear portion of a vehicle to which the vehicle body structure of the present embodiment has been applied. FIG. 6 shows a section representing a junction between a rear floor pan and a side member according to another embodiment.

In the vehicle body structure of the present embodiment, as shown in FIG. 5, a rear floor pan 11 (floor panel) is joined to a front floor pan (not shown) of a flat plate shape to constitute the floor panel of a vehicle. A pair of (right and left) side members 12 are disposed on opposite sides in the vehicle width direction of the rear floor pan 11 so as to extend in the longitudinal direction of the vehicle. A seat 13 in a third row is constituted such that a lower portion of a seat back 16 is supported at a rear portion of a seat cushion 14 via a mounting bracket 15 so as to be pivotable about a support shaft 17.

The rear portion of the seat cushion 14 is mounted on the rear floor pan 11 via a mounting base 18 so as to be pivotable about a support shaft 19, and can be confined at a predetermined position by a locking mechanism (not shown). An accommodation concavity 20 is provided in the rear floor pan 11 behind the seat 13. With the seat back 16 tilted forward to bring the seat 13 into a folded state, the seat cushion 14 and the seat back 16 are turned rearward and inverted, whereby the seat 13 can be accommodated in the accommodation concavity 20. A spare tire 21 is mounted below the accommodation concavity 20 so as to be attachable to and detachable from the rear floor pan 11.

As shown in FIGS. 1 to 4, the rear floor pan 11 is composed of a first rear floor pan 31 (a first floor panel) and second rear floor pans 41 (second floor panels) The first and second rear floor pans 31, 41 and the side member 12 are joined together at nearly vertical surfaces.

That is, the right and left side members 12 as a pair are located on the opposite sides in the vehicle width direction so as to extend along the longitudinal direction of the vehicle. Each of the side members 12 has an upwardly open U-shaped section, and has on one side a flange portion 51 formed by being bent outwardly horizontally, and on the other side a nearly vertical first side surface portion 52 formed so as to extend upwardly beyond the flange portion 51. The first rear floor pan 31 is constituted such that a first bottom surface portion 32 constituting the bottom surface of the accommodation concavity 20 is formed, second side surface portions 33 are formed so as to be erected nearly vertically from the opposite sides in the vehicle width direction of the first bottom surface portion 32, and a nearly horizontal floor surface 34 is formed forwardly of the first bottom surface portion 32. The second rear floor pan 41, on the other hand, is constituted such that a second bottom surface portion 42 is disposed above the side member 12 and is also disposed at nearly the same height as the floor surface 34 of the first rear floor pan 31; a third side surface portion 43 erected nearly vertically is formed on one side in the vehicle width direction of the second bottom surface portion 42, while a fourth side surface portion 44 erected nearly vertically is formed on the other side in the vehicle width direction of the second bottom surface portion 42; and a bend (flange portion) 45 is formed in an upper end portion of the third side surface portion 43 by bending the upper end portion horizontally toward the interior of the vehicle.

First, the side member 12 and the second rear floor pan 41 are joined together by spot welding S1 such that the second bottom surface portion 42 is placed above the side member 12; the third side surface portion 43 is placed adjacent to and outwardly of the first side surface portion 52 in the vehicle width direction; and the flange portion 51 is brought into intimate contact with the second bottom surface portion 42. Then, the first rear floor pan 31 is disposed such that the accommodation concavity 20 is located between the first side surface portions 52 of the pair of side members 12; the second side surface portion 33 of the first rear floor pan 31 is disposed adjacent to and inwardly of the first side surface portion 52 of each side member 12 in the vehicle width direction; and the first side surface portion 52, the second side surface portion 33 and the third side surface portion 43 are brought into intimate contact. In this state, these portions are joined together by spot welding S2. In this manner, the side member 12 and the rear floor pan 11, namely, the side member 12, the first rear floor pan 31 and the second rear floor pan 41, are joined together.

Subsequently, at the site where the first side surface portion 52, the second side surface portion 33 and the third side surface portion 43 are joined together, a sealing member 61 is mounted between the upper ends of the first side surface portion 52 and the second side surface portion 33 and the bend 45 of the third side surface portion 43. Moreover, the fourth side surface portion 44 of the second floor pan 41 is joined to a side panel 62, an acoustic insulator 63 is mounted on the second bottom surface portion 42, and a carpet 64 is laid on the upper surface of the rear floor pan 11, whereby the accommodation concavity 20 capable of accommodating the seat 13 is formed.

In the vehicle body structure of the present embodiment, as described above, the accommodation concavity 20 is provided in the rear floor pan 11. The pair of side members 12, each having the nearly vertical first side surface portion 52, are disposed on the opposite sides in the vehicle width direction of the accommodation concavity 20 so as to extend in the longitudinal direction of the vehicle. The floor panel 11 is composed of the first floor panel 31 having the first bottom surface portion 32, serving as the bottom surface of the accommodation concavity 20, and the second side surface portions 33 erected nearly vertically from the first bottom surface portion 32 and placed adjacent to the first side surface portions 52; and the second floor panel 41 having the second bottom surface portion 42 placed above the side member 12, and the third side surface portion 43 erected nearly vertically from the second bottom surface portion 42 and placed adjacent to and outwardly of the first side surface portion in the vehicle width direction. The side member 12, the first floor panel 31 and the second floor panel 41 are joined together at the first side surface portion 52, the second side surface portion 33 and the third side surface portion 43.

As noted above, the side member 12 and the rear floor pan 11, i.e. the first and second floor panels 31, 41, are joined at the first, second and third side surface portions 52, 33, 43 which are nearly vertical. In the rear floor pan 11, therefore, no bend (bending radius) is required between the second side surface portion 33 and the second bottom surface portion 42. Moreover, a flange portion for joining to the second bottom surface portion 42 of the rear floor pan 11 (second floor panel 41), namely a joining allowance, is not needed in the first side surface portion 52 of the side member 12. As a result, the width of the junction between the floor panel 11 and the side member 12 can be decreased by a relatively simple configuration. That is, the width of the accommodation concavity 20 can be increased by the bending radius and the width of the joining allowance. Consequently, the width of the seat 13 accommodated in the enlarged accommodation concavity 20 can be sufficiently increased, so that the marketability of the vehicle can be enhanced.

Also, the rear floor pan 11 is composed of the first floor panel 31 and the second floor panel 41, and the side member 12 is held between and joined to the first and second floor panels 31 and 41, whereby the assembly of the floor panel 11 and the side member 12 can secure sufficient strength. Moreover, the bend 45 is provided at the junction, and the sealing member 61 is mounted there. Thus, the junction can be reliably rendered waterproof, and accidental detachment of the sealing member 61 can be prevented. Furthermore, the sealing member 61 can be applied to the junction from inside the vehicle, so that work efficiency can be increased.

While the present invention has been described in the foregoing fashion, it is to be understood that the invention is not limited thereby, but may be varied in many other ways.

In the above embodiment, for example, the rear floor pan 11 is composed of the first floor panel 31 and the second floor panel 41, and is joined to the side member 12 at the first side surface portion 52, the second side surface portion 33 and the third side surface portion 43. However, the rear floor pan 11 may be constructed integrally as in the earlier technologies, and the rear floor pan 11 and the side member 12 maybe joined together at nearly vertical surfaces. That is, the second side surface portion 33 connecting the first bottom surface portion 32 and the second bottom surface portion 42, and the first side surface portion 52 of the side member 12 may be joined together, whereby the flange portion (joining allowance) of the side member 12 can be made unnecessary, so that the width of the accommodation concavity 20 can be increased.

In the aforementioned embodiment, moreover, the bend 45 is formed in the upper end portion of the third side surface portion 43 of the second rear floor pan 41 by bending the upper end portion horizontally toward the interior of the vehicle. The front end of the first side surface portion 52 and the front end of the second side surface portion 33 are disposed below, and joined to, the bend 45, with the sealing member 61 being mounted therebetween. As shown in another embodiment of FIG. 6, however, the bend 45' may be formed in the upper end portion of the second side surface portion 33 of the rear floor pan 11 by bending the upper end portion horizontally outwardly of the vehicle. Further, the front end of the first side surface portion 52 and the front end of the third side surface portion 43 may be disposed below, and joined to, the bend 45', with the sealing member 61 being mounted therebetween.

Such variations are not to be regarded as a departure from the spirit and scope of the invention, and all such modifications as would be obvious to one skilled in the art are intended to be included within the scope of the appended claims.

What is claimed is:

1. A vehicle body structure comprising:
a pair of side members extending in a longitudinal direction of a vehicle; and
a floor panel forming an accommodation concavity disposed between said pair of side members,
said side members and said floor panel being joined together,
wherein said side members each are U-shaped, with an opening of the U-shape facing upward, and having a pair of substantially vertical first side surface portions,
wherein said floor panel has a bottom surface portion serving as a bottom surface of said accommodation concavity, and substantially vertical second side portions extending in a substantially vertical direction from said first bottom surface portion and placed adjacent to said first side surface portions, and
wherein the substantially vertical first side surface portion of said pair of side members facing opposite to each other and positioned nearest to each other are positioned adjacent to and joined to said substantially vertical second side portions.

2. A vehicle body structure comprising:

a pair of side members extending in a longitudinal direction of a vehicle; and a floor panel forming an accommodation concavity disposed between said pair of side members, wherein said side members and said floor panel are joined together at substantially vertical surfaces, wherein each of said side members has a substantially vertical first side surface portion, and wherein said floor panel is composed of:

a first floor panel having a first bottom surface portion serving as a bottom surface of said accommodation concavity, and second side surface portions extending in a substantially vertical direction from said first bottom surface portion and placed adjacent to said first side surface portions, and second floor panels each having a second bottom surface portion placed above said side member, and a third side surface portion extending in a substantially vertical direction from said second bottom surface portion and placed adjacent to and outwardly of said first side surface portion in a vehicle width direction, and wherein said first side surface portion, said second side surface portion, and said third side surface portion are joined together.

3. The vehicle body structure according to claim 2, wherein said first floor panel and said second floor panels are independent of each other.

4. The vehicle body structure according to claim 2, wherein a flange portion extending toward an interior of the vehicle is formed at an upper end of said third side surface portion, and an upper end of said first side surface portion and an upper end of said second side surface portion are disposed below said flange portion.

5. The vehicle body structure according to claim 2, wherein a flange portion extending toward an exterior of the vehicle is formed at an upper end of said second side surface portion, and an upper end of said first side surface portion and an upper end of said third side surface portion are disposed below said flange portion.

6. The vehicle body structure according to claim 4 or 5, wherein a sealing member is mounted between said flange portion and the upper end of said first side surface portion and the upper end of said second side surface portion, or between said flange portion and the upper end of said first side surface portion and the upper end of said third side surface portion.

7. The vehicle body structure according to any one of claims 2 to 5, wherein a folding vehicle seat is accommodated in said accommodation concavity.

8. The vehicle body structure according to claim 1, wherein a folding vehicle seat is accommodated in said accommodation concavity.

* * * * *